Sept. 1, 1970  N. MAROPIS ET AL  3,526,030
METHODS AND APPARATUS EMPLOYING VIBRATORY
ENERGY FOR WRENCHING
Filed Dec. 7, 1967  3 Sheets-Sheet 1
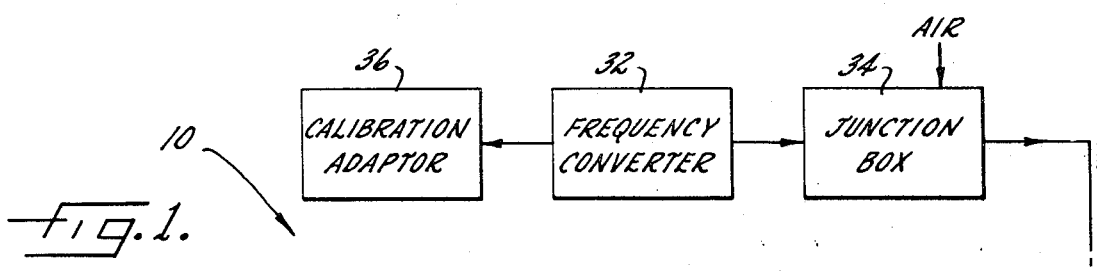
Fig. 1.
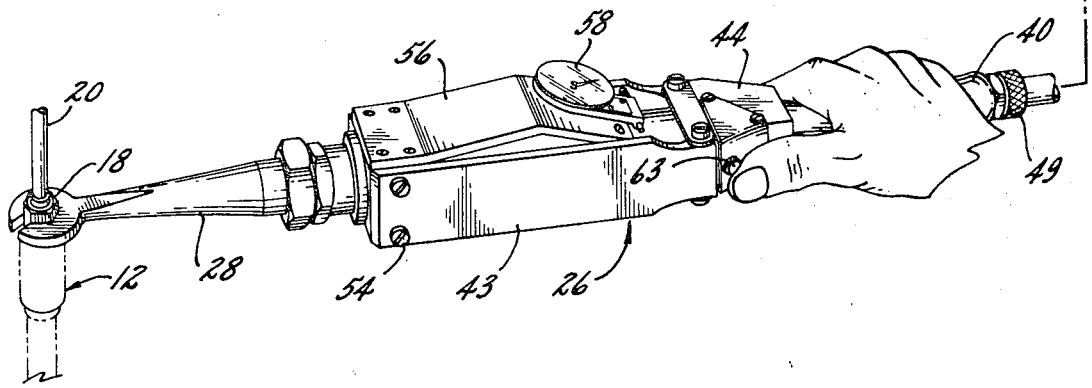
Fig. 2.
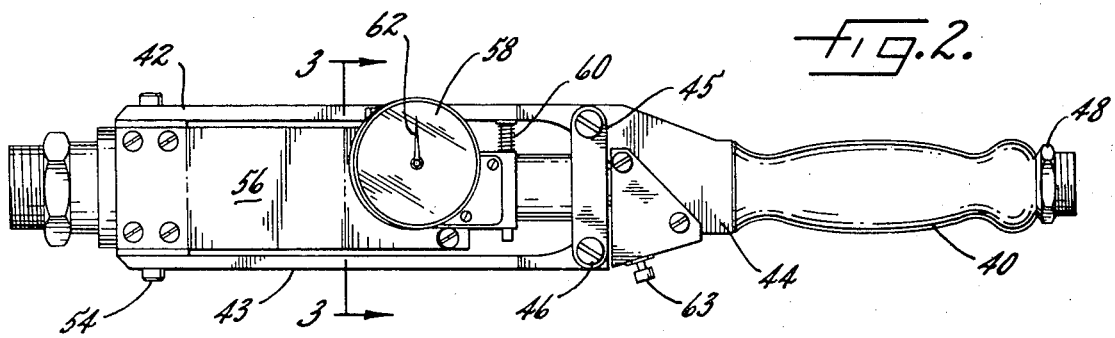
Fig. 3.
Fig. 1a.
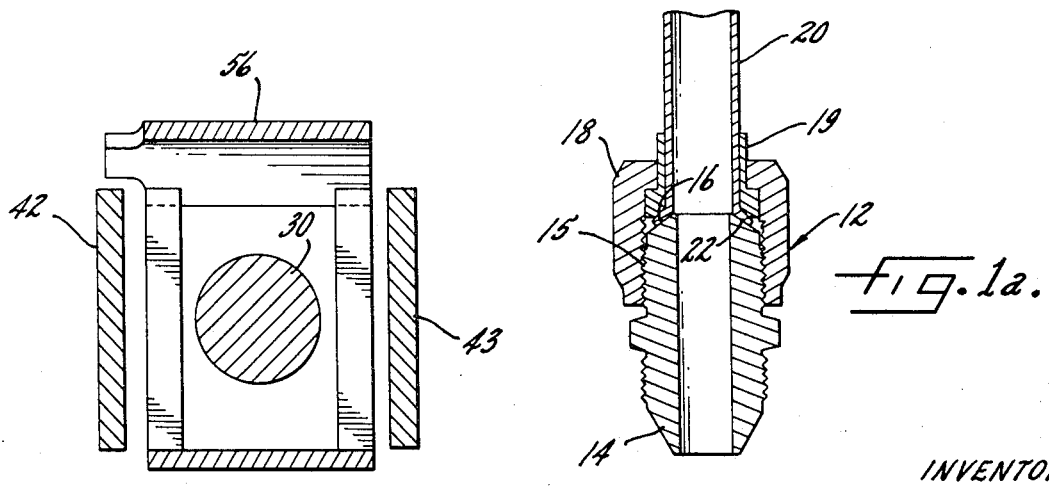
INVENTORS
NICHOLAS MAROPIS
HERMAN T. BLAISE
WILLIAM A. WILSON
Wolfe, Hubbard, Voit & Osann
ATTORNEYS.

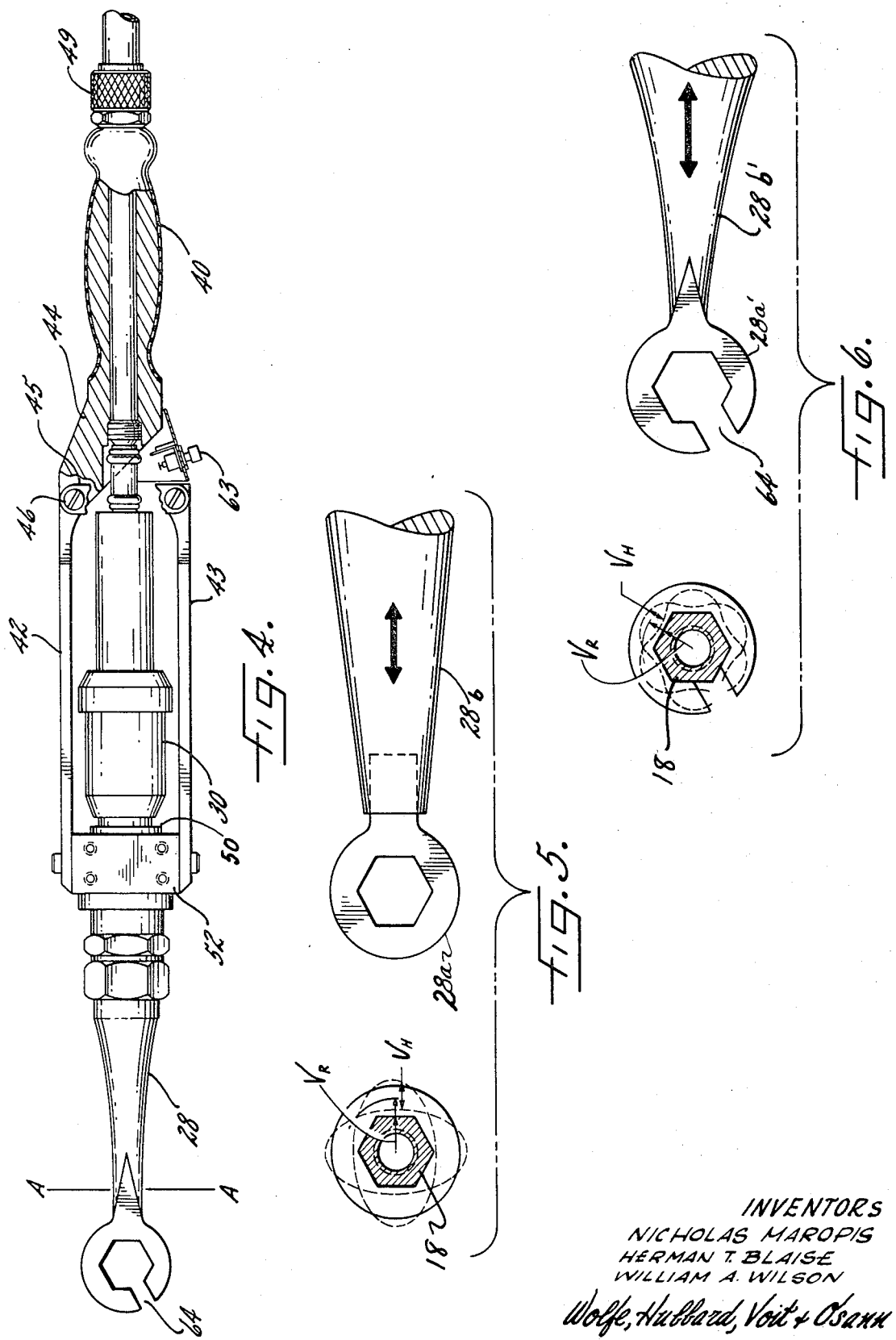

Sept. 1, 1970  N. MAROPIS ET AL  3,526,030
METHODS AND APPARATUS EMPLOYING VIBRATORY ENERGY FOR WRENCHING Filed Dec. 7, 1967  3 Sheets-Sheet 3

INVENTORS
NICHOLAS MAROPIS
HERMAN T. BLAISE
WILLIAM A. WILSON
BY: Wolfe, Hubbard, Voit & Osann
ATTORNEYS understand# United States Patent Office 3,526,030
Patented Sept. 1, 1970

3,526,030
METHODS AND APPARATUS EMPLOYING VIBRATORY ENERGY FOR WRENCHING
Nicholas Maropis, West Chester, Pa., and William A. Wilson and Herman T. Blaise, Huntsville, Ala., assignors, by mesne assignments, to the United States of America as represented by the Administrator of the National Aeronautics and Space Administration
Continuation-in-part of application Ser. No. 674,999, Oct. 12, 1967. This application Dec. 7, 1967, Ser. No. 688,868
Int. Cl. B23p *11/00, 19/00, 19/04*
U.S. Cl. 29—428                              10 Claims

ABSTRACT OF THE DISCLOSURE

Method and apparatus for applying vibratory energy primarily to mechanical fasteners which are elastically compliant along the radius vector so as to effect improved tightening or loosening of said fasteners, wherein the direction of the particle motion constituting the introduced vibration is essentially along the radius vector of the fastener to which the vibration is introduced. Provision is made for tightening the fastener to a predetermined specified torque level and for applying the requisite vibratory energy while simultaneously rotating the fastener an additional amount without extending the said torque level.

---

This application is a continuation-in-part of application Ser. No. 674,999, filed Oct. 12, 1967.

The present invention relates generally to methods and apparatus for vibratory wrenching and, more particularly, to vibratory methods and apparatus for effecting improved tightening or loosening of mechanical fasteners which are elastically compliant along the radius vector. In its principal aspect, the invention is described in connection with improved methods and apparatus for applying vibratory energy while tightening a fastener such as a flared tube coupling nut to increase the compressive load at the flared tube end and coupling component interfaces, yet wherein the applied torque to the coupling nut is not increased above allowable preloading limitations. However, the invention is also applicable to fasteners such as pipe fittings and also nuts if they are elastically compliant along the radius vector. The invention described herein was made in the performance of work under a NASA contract and is subject to the provisions of Section 305 of the National Aeronautics and Space Act of 1958, Public Law 85-568 (72 Stat. 435; 42 U.S.C. 2457).

In co-pending United States patent application Ser. No. 688,867, filed Dec. 7, 1967, entitled "Methods and Apparatus Employing Torsional Vibratory Energy for Wrenching," a different particle motion direction is applied to fasteners having different elastic compliance characteristics.

It has been proposed heretofore to employ vibratory energy as an aid in making mechanical connections. See, for example, U.S. Pat. 2,086,667 issued July 13, 1937, in the name of Harold W. Fletcher and entitled "Method of Engaging Tool Joint Threads"; U.S. Pat. 3,142,901 issued Aug. 4, 1964, in the name of Albert G. Bodine and entitled "Method of Making Shaft Joint Utilizing Gyratory Vibrations"; and U.S. Pat. 3,184,353 issued May 18, 1965, in the names of Lewis Balamuth and Arthur Kuris and entitled "Fastening Together of Members by High Frequency Vibrations." However, no prior art is known to include methods and apparatus of the present invention or to solve the problems which are solved by the present invention.

In many industries, particularly the aircraft industry, connections for tubing which handles fluids under high pressures are made by flaring tube ends and utilizing conventional types of flared tube couplings. These couplings require relative rotation between a coupling nut and union to effect compression of a flared tube end between the union and a compression sleeve which is interposed between the tube and coupling nut.

When connection with such "fitting" is made, the coupling nut may be initially secured by hand or with any suitable tool and then it is "torqued" to a requisite determined preload depending upon the physical dimensions and material of the fitting. A major portion of the expended torque delivered to the coupling nut is dissipated in overcoming friction between the assembly components which can be between the threads of the compression sleeve and nut, or between the surfaces of the flare and mating portion of the union.

Under common assembly techniques heretofore known and used there was a high degree of non-uniformity in connections and, consequently, a substantial percentage of the connections made were not leaktight. Also, it has often been difficult to effect disassembly of such connections after long service without excessive damage to the nut, as by distorting or "rolling over" the corners of the flat wrench faces of the nut.

Accordingly, it is a primary object of the present invention to provide improved methods and apparatus employing vibratory energy for effecting leaktight mechanical connections. While not so limited in its application, the invention will find especially advantageous use for vibratory wrenching in formation of leaktight connections of flared tube couplings and the like.

A related object of the invention is the provision of improved methods and apparatus for applying vibratory energy for increasing leaktightness of flared tube couplings, yet wherein such results are achieved without distorting the components or altering their mechanical properties.

It is a more specific object of the invention to provide an improved apparatus for effecting flared tube connections, which apparatus permits obtaining consistent leaktightness through the application of ultrasonic energy to the connection during tightening. In this connection it is an object to provide a novel ultrasonic wrench for facilitating mechanical connections without damaging or exceeding allowable preload stress to the assembled components.

In another of its important aspects, it is an object of the present invention to provide an ultrasonic wrenching apparatus for tightening tubular geometry components, and especially flared tube connections wherein energy lost due to friction is reduced, yet wherein the torque load applied is more effectively converted to desired sealing force on the flare itself, thus greatly improving leaktightness and reproducibility in such connections.

Other objects and advantages of the invention will become apparent as the following description proceeds, taken in conjunction with the accompanying drawings, in which:

FIG. 1 is a view in perspective of an exemplary vibratory wrenching apparatus embodying the features of the present invention, such apparatus here shown positioned upon a flared tube coupling in readiness for a vibratory tightening operation in accordance with the invention;

FIG. 1a is an enlarged fragmentary transverse sectional view taken through the flared tube coupling shown in FIG. 1;

FIG. 2 is an enlarged elevation view of the wrenching assembly portion of the apparatus shown in FIG. 1, but with the tool head removed;

FIG. 3 is a transverse sectional view taken substantially along the line 3—3 in FIG. 1;

FIG. 4 is an elevation view of the wrench assembly, similar to FIG. 2 but here shown partially in section with the top portion and torque indicating mechanism removed, and with the tool head in position;

FIG. 5 is a diagrammatic illustration of a closed end wrench head together with the vibratory mode (greatly exaggerated) which is delivered thereby;

FIG. 6 is a diagrammatic illustration of an open-end wrench head together with vibratory mode (greatly exaggerated) which it delivers to a coupling nut;

Figure 7:
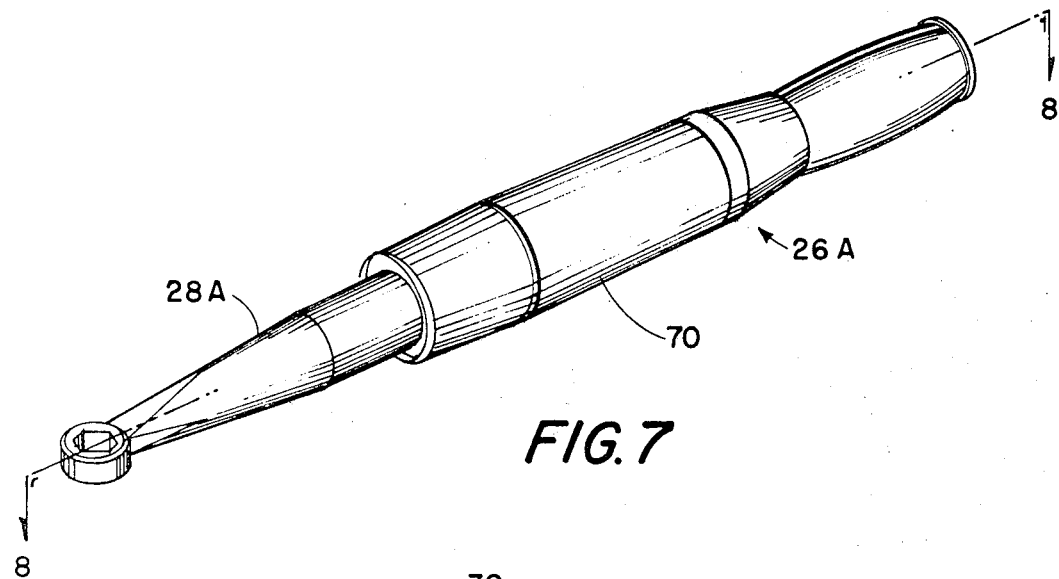
FIG. 7 is a view in perspective of yet another exemplary vibratory wrenching apparatus embodying the features of the present invention.

While the invention is susceptible of various modifications and alternative forms, specific embodiments thereof have been shown by way of example in the drawings and will herein be described in detail. It should be understood, however, that it is not intended thereby to limit the invention to the particular forms disclosed, but on the contrary, the intention is to cover all modifications, equivalents, and alternatives falling within the spirit and scope of the invention as expressed in the appended claims.

Referring now to the drawings, there is illustrated in FIG. 1 an exemplary vibratory wrenching apparatus generally indicated as 10, which is particularly suitable for tightening of a coupling 12 in accordance with the present invention. While the particular type of coupling 12 to be tightened utilizing the present invention is not so limited, it will be appreciated as the ensuing discussion proceeds, that the exemplary vibratory wrenching apparatus 10 will find particularly advantageous utility in leaktight tightening of flared tube connections and the like. It may also be used, for example, with pipe fittings wherein the fitting may be thicker than the wall thickness ordinarily associated with tube connections, provided the fitting is elastically compliant along the radius vector.

As can best be seen in FIG. 1a, coupling 12 includes a union 14 having an external threaded portion 15 terminating in a frusto-conically shaped seat 16, a coupling nut 18 and a resilient compression sleeve 19. A tube 20 having a flared end portion 22 is connected to the union by rotating the coupling nut 18 to compress the flared end of the tube against the seat 16. Such couplings may, for example, be those commonly employed with stainless steel tubing of ⅛ inch to 1 inch diameter and aluminum tubing of ¼ inch to 1 inch diameter.

In carrying out the present invention, provision is made for manually wrenching the coupling nut to at most the the maximum specified torque level for the particular coupling and then applying vibratory energy to the coupling nut for imparting additional rotation to the coupling nut during the application of vibratory energy without exceeding the specified torque level. To this end, the wrenching apparatus 10, FIGS. 1 and 2, includes a wrench 26 which removably receives a suitable tool head 28 (which is an acoustical coupling member or mechanical transformer). The wrench 26 contains a transducer unit 30 (FIG. 4) which converts electrical power to vibratory power and transmits such vibratory power to the tool head.

For providing the requisite high-frequency electrical power to the transducer unit 30 there is provided, as shown diagrammatically in FIG. 1, a frequency converter 32 (sometimes termed ultrasonic power supply or ultrasonic generator).

In order to check the output of the frequency converter a reference standard such as calibration adapter 36 which includes a known resistive load may be employed.

Knowledge of only the main elements of the frequency converter and junction box will permit full understanding of the present invention and for details of an exemplary frequency converter suitable for use with the present invention reference is made to copending U.S. application of Carmine F. De Prisco, Ser. No. 520,726, filed Jan. 14, 1966, now Pat. No. 3,460,025, entitled "Solid State Power Source." Briefly stated, the frequency converter is adapted to change the frequency of the A.C. power supply (i.e. 60 c.p.s.) to match the mechanical or elastic vibratory frequency of the transducer unit in the wrench.

A frequency converter capable of producing electrical signals in at least a portion of the range of between about 60 cycles per second and about 300,000 cycles per second is suitable for the purposes of the present invention. Such frequency range includes both the audible range (up to about 15,000 cycles per second) and the ultrasonic range (generally above about 15,000 cycles per second). Depending on the type and size of fastener to be tightened in accordance with the present invention, a preferred frequency would be in the range from about 10,000 to about 150,000 cycles per second, with the optimum having been found to be between about 20,000 to about 50,000 cycles per second with tubing connections to which reference has been previously made. Normally, a frequency is chosen which will provide a suitable size of apparatus for a given application or set of applications, with the ultrasonic range being inaudible for operator comfort.

In the preferred form of frequency converter for use with the present invention, a power selector, calibrated in terms of tubing diameter, and a timer to provide a variable power pulse duration of from 1 to 5 seconds may be included (not shown). The frequency converter of the described embodiment has a normal rating of about 300 watts continuous operation and 500 watts pulse operation, for tightening flared tube fittings of up to 1-inch tube diameter.

The junction box 34, interposed between the frequency converter and the wrench assembly in the preferred embodiment contains an impedance matching network, transformer, inductance coil, and over-voltage spark gap as is well understood by those skilled in the art.

Cables which extend from the frequency converter 32 to the junction box 34 transmit the necessary control signals and electrical power at ultrasonic frequency (such as 28 kHz.) to drive the transducer unit 30. These cables as well as those leading to the transducer may be contained within a lightweight, rubber-covered metallic flexible tubing which conveniently may be so fashioned as to carry cooling air for the transducer. Since the transducer usually requires clean, dry air at 5 to 10 p.s.i. to assure stable and reliable operation, a source of cooling air is conveniently connected to an inlet on the junction box which may also contain an adjustable pressure regulator and pressure gauge for monitoring and controlling the cooling air.

For insurance of operation at the frequency of maximum power delivery, automatic frequency control may be incorporated to eliminate the necessity for operator adjustment to resonance each time a different-size wrench head is installed.

For details of a type of transducer unit 30, FIG. 4, suitable for use with the present invention cross-reference is made to James Byron Jones and Nicholas Maropis U.S. Pat. 3,283,182, issued Nov. 1, 1966, entitled "Transducer Assembly." While transducer unit 30 is of a particular type and incorporates ceramic transducers, other known types of transducers and transducer arrays may be substituted, such as magnetostrictive or piezoelectric transducers. The transducer is preferably designed to operate at a nominal resonant frequency.

Thus, the combination of transducer 30, tool head 28, and mount 50 (if the mount is used, which is the preferred embodiment as herein indicated) is designed to operate at substantially a given frequency which is preferably a resonant frequency, such as 28 kHz. in this embodiment. Moreover, each resonant element of that combination is preferably dimensioned to have an over-all physical length equivalent to an acoustical length of one-half wavelength (or a whole number multiple of one-half wavelength) in the material of which it is made at the said frequency, in the proper mode as the case may be and as will be explained more fully below, so as to have, for efficient operation, a substantially low-stress area at the interfaces.

In accordance with one of the important aspects of the present invention, provision is made for incorporating the transducer unit into the wrench 26 whereby both initial tightening of the nut and applying of vibratory energy to effect additional angular movement of the nut while substantially maintaining the previously specified torque level can be accomplished. To this end, referring to FIGS. 2, 3, and 4, conjointly, the wrench 26 includes a handle portion 40 and a pair of spaced side beams 42, 43 which receive the transducer unit 30 therebetween. In the present instance beam 42 is integrally formed with the handle portion and one end of beam 43 is attached to the enlarged portion 44 of handle 40 with links 45 and suitable threaded fasteners 46.

The handle 40 is provided with an opening extending longitudinally therethrough to receive the wires from the transducer unit. A threaded connector 48 (FIG. 2) is provided at the end of handle 40 for receiving a mating cable connector 49 (FIGS. 1 and 4) to attach the wrench to the junction box cable.

In order to mount the transducer unit 30 to beams 42, 43, and preferably, as shown in FIG. 4, to minimize frequency shift of the vibratory apparatus and loss of vibratory energy to the associated supporting beams of the wrench, there is provided a force-insensitive mount 50 which is utilized to mount the transducer assembly 30 to the spacer block 52 to which the side beams 42 and 43 are bolted. Such force-insensitive mount 50 may, in general, be a sleeve, ½ wavelength long at the operating frequency and made from type 303 stainless steel or other low hysteresis material such as nickel, aluminum-bronze, beryllium-copper, or Monel. One end of the sleeve is metallurgically bonded to the transducer assembly 30 preferably at an antinode or loop region of the vibration on the latter, and the other end of the sleeve is free from attachment. The mounting block 52 is attached to the sleeve at a location ¼ wave length from the free end of the sleeve, at which location a true acoustical node exists in the sleeve. For details of a force-insensitive mounting arrangement, reference is made to U.S. Pats. Nos. 2,891,178; 2,891,179; and 2,891,180, each of which issued in the name of William C. Elmore on June 16, 1959, and is entitled "Support for Vibratory Devices." The side beams 42, 43 are attached to the mounting block 52 with bolts 54 or the like resulting in a minimum loss of vibratory energy to the beams 42, 43. In addition, an angled plate 56 is fastened (FIGS. 1 and 2) to the mounting block 52 and it provides support for a torque indicating mechanism generally designated 58.

In the present instance, the torque indicating mechanism comprises a spring biased plunger 60 which bears against beam 42 and through a suitable gear arrangement translates the deflection of the beam with reference to angle plate 56 and mounting block 52 into angular displacement of a dial pointer 62 with respect to an indicator face, which may be, for example, calibrated in inch-pounds of torque. Maximum allowable torque levels which can be applied to conventional fittings are usually available from suppliers of such fittings. The specified torque levels should be adhered to because exceeding the maximum allowable torque level for the particular fitting may result in shearing of threads, over-stressing, destruction of the coupling nut or other parts of the fitting, and thus leading to its failure.

For the purpose of activating the ultrasonic power in wrench 26, a push button switch 63 connected to the frequency converter 32 is provided which as shown is mounted by means of a suitable bracket to enlarged portion 44 of the wrench handle. Such positioning of the switch permits easy actuation with the user's thumb while maintaining a firm grasp on handle 40 and applying lateral manual force thereon sufficient to maintain the preselected torque as shown by the dial gauge pointer 62.

In accordance with another important aspect of the present invention the wrench head (which is to be applied to the coupling nut) must vibrate in a particular manner to effectively increase compression between the union and flared tube end without exceeding the specified maximum torque level. To this end, it has been found necessary to have, in accordance with the present invention for the types of fasteners indicated, not merely applied vibration but rather the application of vibration wherein the particle motion constituting the vibration is substantially along the radius vector of the fastener component to which the vibration is introduced. With such action, additional rotation of the nut can be accomplished while maintaining the applied torque substantially constant.

It appears that vibratory motion induced in the nut by the wrench head provides dynamic forces acting essentially perpendicular to the mating thread surfaces, reducing boundary friction and permitting more effective utilization of the applied torque to be converted to sealing stress. As noted, the wrench head vibratory motion $V_H$ is in the plane of and essentially parallel to the radius vector $V_R$ (FIGS. 5 and 6) defining the boundary of the nut 18.

Referring to FIG. 5, there is shown diagrammatically a tool head which includes a closed "box" type 6-point wrench fitment 28$a$ carried by a coupling shank 28$b$ by means of which axial-mode vibratory energy in coupling member 28$b$ is delivered into wrench head 28$a$, exciting said wrench head into a flexural mode which in turn excites a vibratory elastic response of the nut 18.

In accordance with the present invention, this form of wrench head applies a closed flexural or bell mode type of vibration to a coupling nut 18, as indicated by dotted line in FIG. 5. However, with a flared tube coupling or the like, an open-end wrench head 28$a^1$ as shown in FIG. 6 may be preferable since it permits tubing to pass through its slot 64 thereby facilitating application of the tool head to the coupling nut. With the open end tool head, an open "flexural" vibratory mode is applied to the coupling nut, as indicated by dotted lines in FIG. 6. It will be appreciated that physically the vibratory motion is very small and has been greatly exaggerated for purposes of illustration.

Thus, with either open or closed "flexural" modes, the "breathing" effect (that is, in and out motion) that is introduced by the wrench head to the flared tube clamping nut involves generally radial movements inwardly and outwardly in the plane of the nut with respect to the longitudinal axis of the fitting. The closed end wrench head applies vibratory forces to the nut generally as indicated by the dotted line in FIG. 5 in substantially two directions, while an open end wrench applies forces generally as indicated by the dotted lines of FIG. 6, according to the number of nodes (positions of zero lateral motion) and antinodes (positions of maximum lateral motion), as governed by the operating frequency, wrench head mean circumference, Young's elastic modulus, and line mass of the wrench head material, and the mean moment of inertia of the wrench head section about a line perpendicular to the plane of the wrench and on the mean circumference. The vibratory motion exemplified by FIG. 6 shows six antinodes and five nodes comprising the flexural vibratory motion of the wrench head with loops at the free ends.

Figure 8:
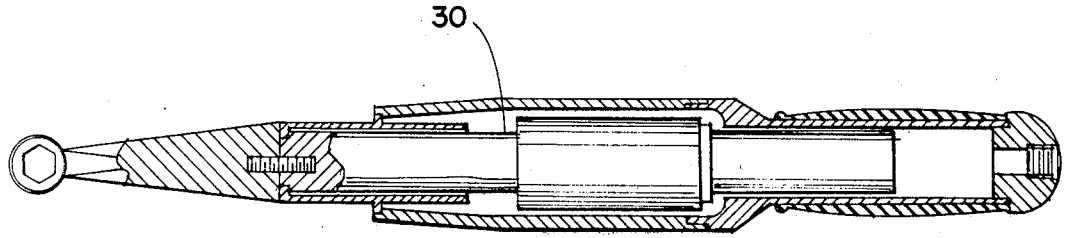
FIG. 8 is a sectional elevation view of the wrench assembly shown in FIG. 7.

Referring to FIGS. 7 and 8, there is shown a modified form of wrenching apparatus, generally indicated at 26A which is particularly suited for tightening or loosening mechanical fasteners. In the present instance the wrench includes a body portion 70 serving as an outer covering and also as a handle for direct exertion of torque. The body portion 70 is preferably mounted to the transducer 30A with a force-insensitive mounting arrangement such as previously described herein. The coupler 28A mounted on the transducer is similar to that of the apparatus shown in FIGS. 1 and 4. The wrench assembly 26A is a non-indicating wrench, and the wrench may be applied to a nut or other similar mechanical fastener which is elastically compliant along the radius vector as to effect improved tightening or loosening of the fastener.

It is to be noted that the apparatus of FIGS. 1 and 4–8 involves vibratory mode conversion, from the longitudinal mode vibration of transducer unit 30 or 30A and of its associated portion 28b or 28b¹ of tool head 28 or 28¹ to the flexural vibrational mode of the wrench head or fitment 28a or 28a¹ (in which wrench head or fitment the direction of the particle motion constituting the vibration in the fitment is essentially along the radius vector of the fastener to which the vibration is to be applied. This mode conversion involves certain problems (such as those relating to acoustical impedance matching, for purposes of maximum transmission of vibratory power). However, in the present state of the technology, such mode conversion is necessitated in practical apparatus for performing useful wrenching work vibratorily, since no transducers suitable for power-delivery applications of vibratory energy in the flexural mode are known to be commercially available or to be readily extrapolatable for the purpose from available information on non-power-delivery transducers involving modes other than the longitudinal.

As previously noted the shank 28b¹ is vibrated longitudinally and the fitment 28a or 28a¹ is vibrated flexurally. Thus, the mode conversion locale is the intersection of the coupler member 28b and the periphery of the wrench head 28a whereat the longitudinal motion of 28b or 28b¹ produces flexural motion in 28a or 28a¹. This section therefore must be capable of withstanding the combination of the static and dynamic vibratory stresses. The wrench head should be resonant at the design frequency of the wrench and in the desired mode, and the sections of the fitment surrounding the coupling nut to be tightened must be capable of withstanding the application of static and acoustic stresses associated with torquing and the elastic excursions of the nut, as will be appreciated by those skilled in the art.

The longitudinally vibrating shank 28b¹, is preferably designed in accordance with the exponential taper law for mechanical vibratory motion transformers:

$$A_x = A_0 e^{-\alpha x}$$

where:

$A_0$ is the area of the shank at the large-diameter end,
$A_x$ is the area at any section $x$ distance from the large-diameter end, $\alpha$ = the taper factor = $\frac{1}{l} \ln \frac{A_0}{A_t}$ ln = natural logarithm,
$A_t = A_x$ at the terminus of the shank,
$l$ = corrected length of the shank due to the taper, and $$l = \frac{c}{2\omega} \sqrt{\pi^2 + \ln \frac{A_0}{A_t}}$$

The closed wrench head may be designed via an equation for the "breathing mode" (see H. Lamb, "The Dynamical Theory of Sound"):

$$N^2 = \frac{S^2(S^2-1)Ek^2}{(S^2+1)\rho a^4}$$

where:

$N = 2\pi f$ ($f$ = frequency),
$S$ = order of the mode (2 nodes per each S) (closed end, S=2),
$E$ = Young's modulus,
$k$ = radius of gyration of a section normal to the plane of motion and about the neutral axis,
$a$ = mean radius of the wrench head.

The design of the open end wrench head may be based upon the equation for vibrating bars (see A. W. Van Santen, "Introduction to a Study of Mechanical Vibrations") with experimental correction to account for the curvature associated with forming of the circular wrench head:

$$f_o = C \sqrt{\frac{EI}{ml^4}}$$

where:

$f_o$ = the natural frequency, given as $V_o$ in the text,
$C$ = a constant depending upon the boundary conditions and vibratory overtone of operation,
$E$ = Young's modulus,
$I$ = moment of inertia of a plane about the neutral axis,
$m$ = line mass (mass/unit length),
$l$ = total length of vibrating bar (mean circumference of the wrench head).

In order to more fully understand the mode of operation of the exemplary vibratory wrenching apparatus, reference is now made to FIG. 1 wherein the apparatus is shown in readiness for a vibratory tightening operation in accordance with the present invention. In making an assembly, the coupling nut 18 and compression sleeve 19 are placed over the tubing and the end of the tubing is flared with apparatus well known in the art. The flared end is then seated against the union and the coupling nut is initially tightened by hand or with any other suitable tool. The tool head 28 of the wrench 26 is then applied to the coupling nut and the nut is tightened to the predetermined specified torque level, which will be indicated by the dial gauge of the torque indicating mechanism 58.

When the specified torque level for the particular fitting is reached as indicated by the pointer 62, the switch 63 is depressed to cause application of ultrasonic power. As the power is applied, the wrench may be rotated an additional amount while maintaining the same torque level or until the same specified torque level is again reached should the torque decrease when the power is applied. If, as in the described embodiment, there is provision for a one-to-five second on-off pulse and a 3-second on-off pulse time has been selected, the power will be automatically turned off after that time duration, and the wrench head can be removed from the coupling nut.

In the following table there is shown by way of example the amount of acoustic power applied with an exemplary wrench incorporating a ceramic transducer, to various sizes of aluminum and stainless steel couplings to effect leaktight connections in accordance with the present invention. Note that more power was required with increased tube diameter. It may be noted that the obtainable additional relative rotation was found to be greater with dry-film lubricant in the threads than with unlubricated coupling components.

| Tube diameters (inches): | Acoustic power (watts) |
|---|---|
| ⅛ | 10 |
| ¼ | 25–35 |
| ⅜ | 35–100 |
| ½ | 75–100 |
| ¾ | 125–150 |
| 1 | 165–200 |

In other tests, likewise in connection with assemblies of 6061–T6 aluminum alloy components and also those of CRES–304 stainless steel, nut rotation was increased by a 14-degree average, measured tensile strains in the nuts were increased, higher sealing stresses were produced on the tube flares, and additional breakaway torque was necessary to loosen the assemblies which had been tightened by means of the present invention. Leaktightness, as determined with assembled fitting with a mass spectrometer (Veeco MS–9AB), was increased by an average of 73 percent for the aluminum and 26 percent for the steel connections.

Standard commercial quality fittings of 2024–T6 aluminum alloy and AISI–316 stainless steel were also tightened under similar conditions and with similar results.

Improved sealing was obtained even when flare angle and eccentricity, lip-edge beveling, and surface finish were not of optimum quality.

It may be noted that, for a given size connection, there is a maximum power level beyond which the components may be damaged. If such damage should be a deterring factor in certain applications, this level can be ascertained by a minor amount of experimentation well within the skill of technicians.

For example, useful tightening effects were obtained with from 50–150 watts (electrical input to a nickel-transducer-equipped wrench) for ¼-inch aluminum components and 200–400 watts for steel components. Indicated power densities, considering flare surface areas, were 165 watts/square centimeter and 159 watts/square centimeter, for the aluminum and steel components respectively—the comparability seeming to imply a major portion of the power acting to overcome friction.

While the above information has involved improved tightening, it will be appreciated that the present invention may be utilized to facilitate loosening of fasteners by reversing the direction of torque application.

We have found it surprising that tubing of the above-described type, which theoretically we would deem better-drivable in the torsional mode, did not give additional rotation, and this invention is superior for the purpose. The tubing and union were apparently torsionally weak and complied elastically, the whole assembly reacting instead of one of the components. Thus, the whole assembly "went with" the wrench head, possibly because the hollow tubing had a torsional-vibratory complance so that the torsional mode was ineffective.

We believe that our invention would not be applicable efficiently to large bolts and/or high torque values, whereas the invention in the above-listed co-pending application would be. However, we believe our invention to be valuable in connection with pipe-fitting-type fasteners and others of the relatively-structurally-compliant type, including nuts whose size and torque levels are relatively low. Note that hollowness per se is not necessarily a factor, even though tubing has been mentioned, since a bolt could have a small-diameter axial hole but would not be susceptible of efficient treatment by means of our invention, inasmuch a thick-walled situation would appertain.

Thus, in one case of applying the present invention to a nut, we obtained a 20 percent increase in bolt stress (at the same static torque level), and we also easily removed a severely rusted nut which had been essentially "frozen" to the bolt by long exposure to atmospheric environmental conditions, both being done by means of the present invention, using both a "flexural" open and a closed wrench head of the type shown and described in FIGS. 5 and 6. It is our belief that application of flexural vibration to the nut effected relative micro-motion at the thread interfaces without serious loss of vibratory energy to remote items or components attached to the fittings being wrenched.

Frequencies of vibration used with our invention may be selected primarily on the basis of practical physical size, since frequency per se is unrelated to and/or independent of the resonant frequency in any of the vibratory modes of the fasteners we have described.

The present invention has been described above in connection with vibration of the appropriate direction supplied by means of "flexural" vibrations, open or closed. However, the axial (longitudinal or extensional) mode or the radial mode may be employed if the vibration introduced to the fitting is essentially along the radius vector.

While we prefer that flexural vibration be employed, there is disclosed in the above-listed co-pending application torsional vibration for tightening fasteners which are non-compliant along the radius vector, and it is possible to combine the two inventions as by using an off-axis wrench head with the present invention so that the flexural vibration occurs with some torsional component.

It will be appreciated that the wattage indicated in the above examples is exemplary only, and that power input may be varied according to the operating conditions utilized, including the mechanical fastener being wrenched, and also according to the transducer-coupling system employed. Likewise, with power variable, time can be varied as needed.

As is well known to those skilled in the technology, power output (to the work) of acoustical vibration devices is not readily ascertainable directly, and indirect determination thereof often involves the use of liquids and other aspects not suitable for ready adjustment to differing industrial applications. Moreover, permissible power input is altered according to the type of transducer utilized and the acoustical coupler geometries and materials used, as well as such factors as the efficiencies of joints between the various members of the transducer-coupling system. For example, a magnetostrictive transducer is more rugged and trouble-free than a ceramic transducer, but it has a lesser efficiency in converting electrical power into mechanical vibratory power, and steel is a more readily machinable and joinable coupler material than Monel or beryllium-copper but it has a lesser acoustical transmission efficiency.

Better manipulation of the wrenching apparatus may be achieved in various ways, as by adjusting the center of gravity, utilizing different materials for wrench components, designing for a smaller size or a higher frequency—if the resulting wrench would be more practical for the fitting to be wrenched. Also, automatic triggering of the vibratory pulse at a preset torque level may be provided for, so that the operator need provide only torquing effort in a practical production situation.

We claim:

1. The method of effecting leaktight mechanical connections with tubing couplings and the like which include a coupling nut, a fitting adapted to receive said nut, and compression means interposed between the tube to be connected and the nut comprising the steps of rotatably tightening said coupling nut to a predetermined specified torque level, applying vibratory energy of a flexural mode and in a frequency range of about 10,000 to 60,000 cycles per second to the nut and simultaneously rotating said nut an additional amount without exceeding said specified torque level applied to said nut.

2. The method in accordance with claim 1 in which the vibratory energy is introduced for a time of from approximately one second to several seconds.

3. A vibratory wrenching apparatus for tightening of tube couplings and the like comprising, in combination, a frequency converter for supplying alternating current, means for generating mechanical vibratory energy coupled to said frequency converter, a wrench including a handle portion and at least one beam member extending outwardly therefrom, means for mounting said vibratory energy generating means adjacent the beam end opposite said handle portion, a tool head adapted to receive a coupling to be tightened, and means for removably securing said tool head to the vibratory energy generating means so that said vibratory energy of a flexural mode and in a frequency range of about 10,000 to 60,000 cycles per second is applied to said couplings through the tool head while rotation of the latter is accomplished by means of said handle portion.

4. A wrenching apparatus as claimed in claim 3 including torque indicating means mounted adjacent one end of said beam and cooperating means associated with said beam for translating deflection of said beam into applied torque indications upon angular movement of said wrench with the tool head applied to said coupling.

5. Ultrasonic wrenching apparatus including a source of power comprising wrench means including a body having a handle portion, means including a transducer mounted on the body at an end opposite said handle portion, and a tool head removably coupled to said transducer, said transducer exciting said tool head so as to impart vibratory energy thereto of a flexural mode and in a frequency range of about 10,000 to 60,000 cycles per second.

6. Ultrasonic wrenching apparatus as claimed in claim 5 wherein said body portion comprises at least one beam member extending outwardly from said handle portion.

7. Ultrasonic wrenching apparatus as claimed in claim 6 including torque indicating means mounted adjacent one end of said beam and cooperating means associated with said beam for translating beam deflection into torque readings.

8. Ultrasonic wrenching apparatus as claimed in claim 6 including a second beam parallel to and spaced from said one beam member, said transducer being mounted between said beams and means for mounting said second beam to said handle portion and said transducer mounting means.

9. Ultrasonic wrenching apparatus as claimed in claim 8 wherein said transducer mounting means comprises a force-insensitive mount for minimizing frequency shift of the vibratory apparatus and loss of vibratory energy to said beams.

10. A tool head for use with an ultrasonic wrenching apparatus including a source of power, wrench means having a handle portion and at least one beam member extending outwardly therefrom, and means including a transducer mounted on said beam adjacent the beam end opposite said handle portion, said tool head comprising a shank terminating in a wrench fitment at one end, means for coupling said shank to said transducer whereby vibratory energy in a frequency range of about 10,000 to 60,000 cycles per second can be imparted to said tool head, and said tool head being designed according to relationships which insure the conversion of longitudinal-mode vibration at said shank coupling to flexural-mode vibration at said wrench fitment.

References Cited
UNITED STATES PATENTS

| 2,086,667 | 7/1937 | Fletcher | 29—407 |
| 2,891,178 | 6/1959 | Elmore | 310—26 |
| 2,891,179 | 6/1959 | Elmore | 310—26 |
| 2,891,180 | 6/1959 | Elmore | 310—26 |
| 3,142,901 | 8/1964 | Bodine | 29—525 |
| 3,184,353 | 5/1965 | Balamuth et al. | 29—526 X |
| 3,257,721 | 6/1966 | Jones | 29—470.1 |

THOMAS H. EAGER, Primary Examiner

U.S. Cl. X.R.

29—240, 526